United States Patent
Costello et al.

(10) Patent No.: US 9,952,092 B2
(45) Date of Patent: Apr. 24, 2018

(54) MATRIX ARRANGEMENT OF PHOTODETECTOR FOR USE AS A PROXIMITY SENSOR AND AMBIENT LIGHT SENSOR

(71) Applicant: Avago Technologies General IP (Singapore) Pte. Ltd., Singapore (SG)

(72) Inventors: James Costello, Singapore (SG); Gek Yong Ng, Singapore (SG); Siong Lee Loh, Singapore (SG); Boon Keat Tan, Singapore (SG)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 179 days.

(21) Appl. No.: 14/927,724

(22) Filed: Oct. 30, 2015

(65) Prior Publication Data
US 2017/0122801 A1    May 4, 2017

(51) Int. Cl.
*G01J 1/42* (2006.01)
*G01J 1/46* (2006.01)
*G01J 1/04* (2006.01)
*G01S 7/491* (2006.01)
*G01S 17/02* (2006.01)
*G01J 1/02* (2006.01)

(52) U.S. Cl.
CPC ........... *G01J 1/4228* (2013.01); *G01J 1/0228* (2013.01); *G01J 1/0411* (2013.01); *G01J 1/4204* (2013.01); *G01J 1/46* (2013.01); *G01S 7/4918* (2013.01); *G01S 17/026* (2013.01)

(58) Field of Classification Search
CPC .... G01J 1/42; G01J 1/4228; G01J 1/46; G01J 1/4204; G01J 1/0411
USPC ........................................ 250/214 AL, 214 B
See application file for complete search history.

(56) References Cited

U.S. PATENT DOCUMENTS

| | | | |
|---|---|---|---|
| 8,441,457 B2 * | 5/2013 | Ishihara | ................. G06F 3/0412 345/173 |
| 8,461,530 B2 | 6/2013 | Findlay et al. | |
| 9,006,636 B2 | 4/2015 | Findlay | |
| 9,608,132 B2 * | 3/2017 | Kriebernegg | ............ G01V 8/10 |
| 2008/0006762 A1 * | 1/2008 | Fadell | ................... G01J 1/4204 250/201.1 |
| 2008/0167834 A1 * | 7/2008 | Herz | ..................... G06F 1/3203 702/150 |

(Continued)

OTHER PUBLICATIONS

"MAX44000 Ambient and Infrared Proximity Sensor", 19-5859; Rev 0, Maxim Integrated, Oct. 2011, 24 pages.

(Continued)

*Primary Examiner* — Seung C Sohn
(74) *Attorney, Agent, or Firm* — Sheridan Ross P.C.

(57) ABSTRACT

An optical sensor and optical system are disclosed. The optical sensor is disclosed to include a light source, a photodetector having a proximity sensing portion and an ambient light sensing portion, and a controller configured to implement a proximity sensing phase where the proximity sensing portion of the photodetector is utilized to obtain an incident light reading when the light source is ON and then implement an ambient light sensing phase where the ambient light sensing portion of the photodetector is utilized to obtain an incident light reading when the light source is OFF.

20 Claims, 9 Drawing Sheets

(56) References Cited

U.S. PATENT DOCUMENTS

2010/0102230 A1    4/2010  Chang et al.

OTHER PUBLICATIONS

"Digital Ambient Light Sensor and Proximity Sensor with Interrupt Function", Intersil Americas LLC, Oct. 8, 2012, 19 pages.

* cited by examiner

MATRIX ARRANGEMENT OF PHOTODETECTOR FOR USE AS A PROXIMITY SENSOR AND AMBIENT LIGHT SENSOR

FIELD OF THE DISCLOSURE

The present disclosure is generally directed toward sensing devices and, in particular, toward optical sensing devices.

BACKGROUND

There are many different types of sensors on the market, with each having specific capabilities, uses, and shortcomings. Two types of sensors that utilize optical components for sensing purposes are ambient light sensors and proximity sensors.

Ambient light sensors normally use a relatively small number of photosensitive pixels. In other words, the photosensitive area of an ambient light sensor is usually relatively small. Ambient light sensors are used in a number of applications such as mobile communication devices, laptops, Personal Digital Assistants, web cameras, imaging, photography, etc. As the name suggests, ambient light sensors are primarily used to measure or detect ambient light.

Proximity sensors, as compared to ambient light sensors, typically include a light source and a corresponding photodetector. The photodetector of a proximity sensor, not unlike the ambient light sensor, includes a number of photosensitive pixels. Proximity sensing (e.g., detecting a presence or proximity of an object near the sensor) involves transmitting light via the light source and then receiving light that reflects off an object-to-be-detected at the photodetector. The types of applications in which proximity sensors are used include mobile communication devices, industrial equipment, manufacturing equipment, touchless/sanitary devices, etc.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

With reference now to FIGS. 1-9, an optical system 100 and various configurations of a an optical sensor that can be used within such an optical system 100 will be described in accordance with at least some embodiments of the present disclosure. It should be appreciated that any aspect of any optical sensor configuration can be used in combination with or in lieu of any other aspect of other optical sensor configurations described herein. For instance, aspects of the optical sensor configuration depicted in FIGS. 4 and 5 may be utilized in combination with or in lieu of aspects of the optical sensor configuration depicted in FIGS. 7, 8, and/or 9.

Figure 1:
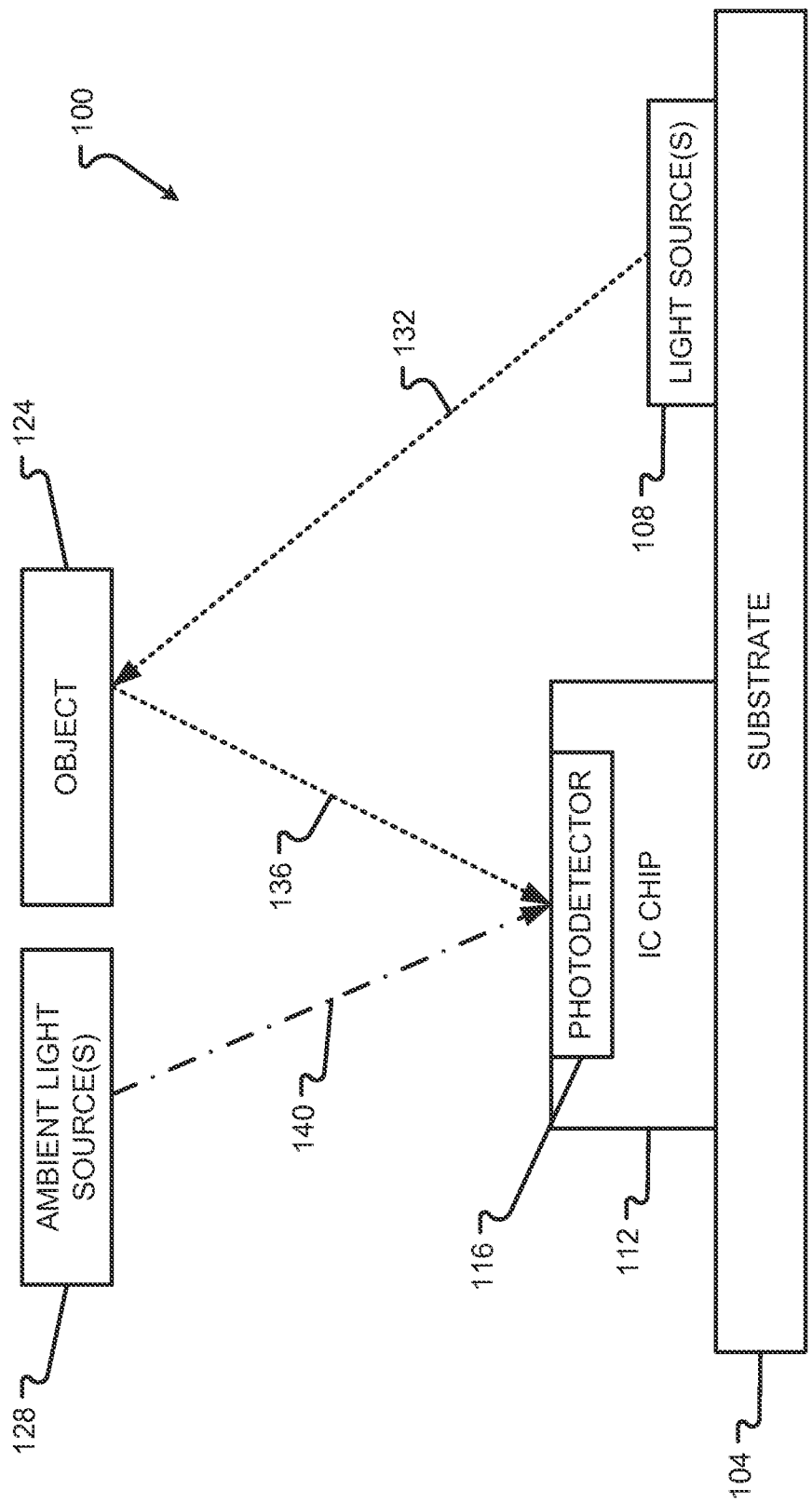
FIG. 1 depicts a block diagram of an optical system in accordance with embodiments of the present disclosure.

Referring initially to FIG. 1, details of an optical system 100 will be described in accordance with at least some embodiments of the present disclosure. The optical system 100 is shown to include a substrate 104 on which an Integrated Circuit (IC) chip 112 and one or more light source 108 are mounted. It should be appreciated that the substrate 104 may be optionally divided into multiple substrates and each portion of the substrate 104 may support different components. Although not depicted, the substrate 104 may also physically support or be directly connected to an optical element 304 (see FIG. 3) that is used to direct/disperse/focus light for a photodetector 116 provided on the IC chip 112. Similarly, the light source may be optically coupled to an additional optical element 306 (See FIG. 3).

The substrate 104 may include any type of object or collection of objects capable of physically supporting the light source(s) 108 and/or IC chip 112. The substrate 104 may also include elements that enable current/electrical signals to pass between objects mounted thereto. As an example, the substrate 104 may include a Printed Circuit Board (PCB) or the like and the IC chip 112 and light sources 108 may be mounted to the substrate 104. Examples of technologies that may be used to connect the light source(s) 108 and/or IC chip 112 to the substrate 104 include, without limitation, thru-hole mounting technologies, surface mount technologies, flip-chip mounting technologies, or the like.

The light source(s) 108 may correspond to a single light source or a plurality of light sources. The light source(s) 108 may be configured to emit radiation of a predetermined wavelength either continuously, periodically, and/or intermittently. A driver for the light source(s) 108 (not depicted) may be used to provide a driving current to the light source(s) 108, which causes the light source(s) 108 to produce emitted light 132. The driver may employ logic to have the light source(s) 108 only emit light during a certain period of time during which proximity detection is being performed by the IC chip 112. When proximity detection is not being performed (e.g., if ambient light detection is being performed instead or if no detection is currently being performed to save battery life), the driver for the light source(s) 108 may not transmit a drive signal to the light source(s) 108, thereby resulting in no production of the emitted light 132. Examples of suitable light source(s) 108 include, without limitation, a Light Emitting Diode (LED), a collection of LEDs, a laser diode, a collection of laser diodes, a Vertical Cavity Surface Emitting Laser (VCSEL), or any other solid-state light-emitting device. As a non-limiting example, if multiple light sources 108 are used, then two or more of the different light sources 108 may be configured to emit light of the same characteristics (e.g., color, wavelength, frequency, etc.) or light of different characteristics. Light as referred herein include both visible and non-visible radiation.

The IC chip 112 may include any type of known digital processing components (e.g., transistors, logic gates, latches, etc.). In some embodiments, the IC chip 112 may include its components in a silicon format. The photodetector 116 may correspond to an optically sensitive set of pixels established on or in the IC chip 112 in an array or the like. For example, the photodetector 116 may correspond to an array of photo-sensitive pixels established across the exposed surface of the IC chip 112 (e.g., the surface facing away from the substrate 104). The photodetector 116 may be configured to convert incident light 136, 140 into electrical signals that are transferred to other components of the IC chip 112, processed, and eventually results in the IC chip 112 producing an output via one or more of its leads that are connected to the substrate. As will be discussed in further detail herein, the photodetector 116 may be divided into two distinct portions, where one area of the photodetector 116 is responsible for receiving and converting first incident light 136 into first electrical signals used for a first purpose (e.g., proximity detection) and where another area of the photodetector 116 is responsible for receiving and converting second incident light 140 into second electrical signals used for a second purpose (e.g., ambient light sensing). The photodetector 116 may comprise a plurality of pixels that may be arranged in an array.

In some embodiments, the first incident light 136 received at the photodetector 116 may result in the creation of a first electrical signal that is provided to a first set of processing components in the IC chip 112. On the other hand, the second incident light 140 received at the photodetector 116 may result in the creation of a second electrical signal that is provided to a second set of processing components in the IC chip 112 that are different from the first set of processing components that receive the first electrical signal. In this way, the space of the IC chip 112 can be multi-functional and capable of processing signals produced by the photodetector 116, regardless of whether the signals are being used for proximity detection purposes or ambient light sensing purposes. Furthermore, the outputs of such processing may be produced by the IC chip 112 on a common output lead or on different output leads. Where different output leads are utilized to output the different output signals (e.g., proximity detection output signal and ambient light sensing output signal), then different traces on the substrate 104 may be used to carry the different output signals. Where the same output lead of the IC chip 112 is used to output the different signals (e.g., on a time-varying basis), then the same trace on the substrate 104 may be used to carry both output signals, but at different times.

Although not depicted, there may be one or more elements positioned between the object 124 and photodetector 116. Examples of such elements include optical elements 304, a cover/protector, or the like. Any element residing between the object 124 and photodetector 116 may be substantially transparent or semi-transparent to light emitted 132 by the light source(s) 108 as well as environment light 140 emitted by ambient light source(s) 128. In some embodiments, the emitted light 132 produced by the light source(s) 108 may correspond to infrared light or light of some other wavelength not visible to the naked human eye. The environmental light 140, on the other hand, may correspond to visible light, infrared light, ultraviolet light, or light of some other wavelength that is or is not visible to the naked human eye. The ambient light source(s) 128 may correspond to any number of elements that produce environmental light 140. Examples of ambient light source(s) 128 include, without limitation, the sun, light bulbs, display screens, televisions, projectors, and anything else capable of producing light.

As shown in FIG. 1, emitted light 132 produced by the light source(s) 108 may be directed away from the substrate 104 such that it impacts an object 124 within proximity of the light source(s) 108. The object 124 may reflect some or all of the emitted light 132 as reflected light 136. The reflected light 136 may be of the same or similar wavelength as the emitted light 132. Examples of the object 124 include, without limitation, a finger, stylus, person's body part, animal, manufactured component, or the like. Indeed, any item or collection of items capable of partially or completely reflecting the emitted light 132 may be considered an object 124.

Figure 3:
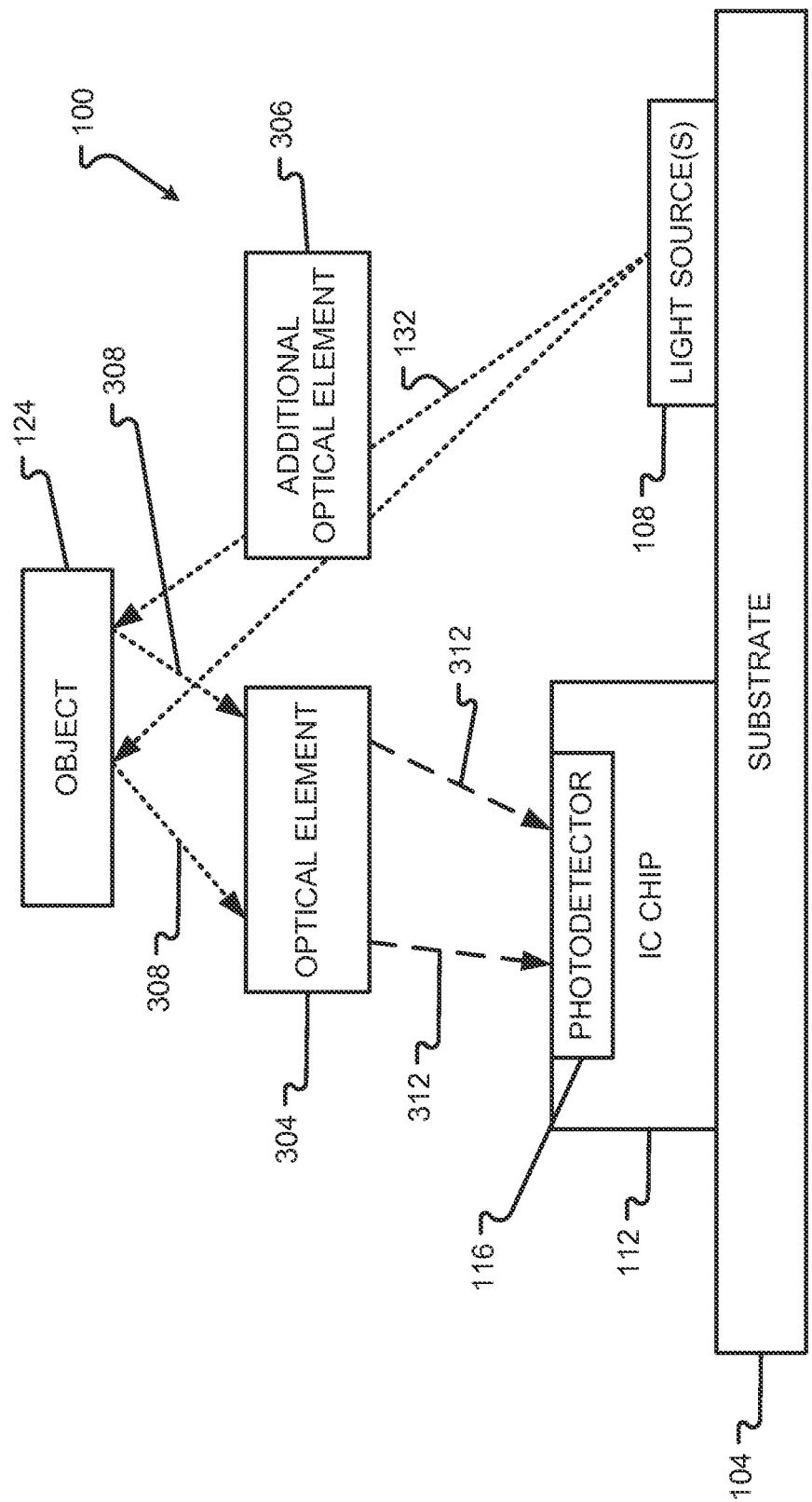
FIG. 3 is a block diagram depicting an optical system having an optical element in accordance with at least some embodiments of the present disclosure.

FIG. 1 shows a configuration of the optical system 100 without an optical element whereas FIG. 3 shows a configuration of the optical system 100 with an optical element 304. Either configuration may be utilized without departing from the scope of the present disclosure.

When there is no optical element as shown in FIG. 1, the reflected light 136 may travel to the photodetector 116. Upon impacting the photodetector 116, the photodetector 116 may generate a corresponding electrical signal which may or may not be proportional to the intensity of the reflected light 136 incident on the photodetector 116. This electrical signal may be provided to circuitry within the IC chip 112. Similarly, when the second incident light 140 reaches the photodetector 116, the photodetector 116 may produce a second electrical signal that may or may not be proportional to the intensity of the ambient light 140 incident on the photodetector 116.

Figure 2A:
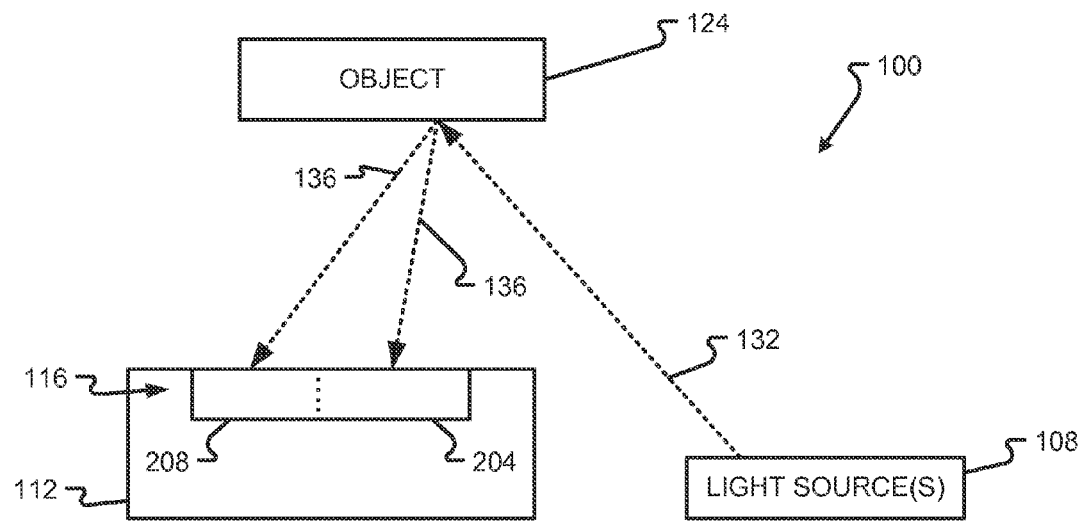
FIG. 2A is a block diagram depicting additional details of the optical system during a proximity sensing phase of operation in accordance with at least some embodiments of the present disclosure.
Figure 2B:
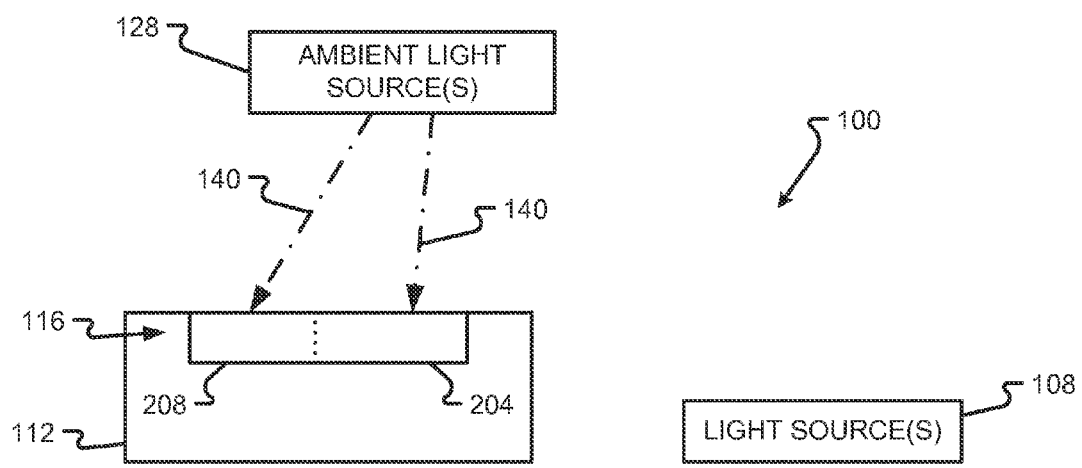
FIG. 2B is a block diagram depicting additional details of the optical system during an ambient light sensing phase of operation in accordance with at least some embodiments of the present disclosure.

With reference now to FIGS. 2A and 2B, additional details of the photodetector 116 will be described in accordance with at least some embodiments of the present disclosure. The photodetector 116 is shown to include a photosensing area 204 (also referred to herein as a "PS area" for ease of discussion) and an ambient light sensing area (also referred to herein as an "ALS area" for ease of discussion). The PS area 204 may correspond to a set of pixels or an area of the photodetector 116 that is controlled to be responsive to reflected light 136 (e.g., produce an electrical signal when reflected light 136 is incident on the photodetector 116). On the other hand, the ALS area 208 may be controlled to be responsive to ambient light 140 from ambient light source(s) 128.

In some embodiments, the PS area 204 and ALS area 208 may be integral to a common piece of material or silicon. In particular, the PS area 204 and ALS area 208 may share a common area of the photodetector 116. Even more particularly, the PS area 204 may correspond to a set of pixels in the photodetector 116 array that are active during a first sensing phase (e.g., a proximity sensing phase of operation). The ALS area 208 may correspond to a different set of pixels in the photodetector 116 array that are active during a second sensing phase (e.g., an ambient light sensing phase of operation). In some embodiments, the PS area 204 and ALS area 208 may be controlled in a coordinated fashion such that only one of the areas 204, 208 is active at a given time. For instance, pixels of the PS area 204 may be active (e.g., connected to underlying components of the IC chip 112) during the proximity sensing phase of operation whereas pixels of the ALS area 208 may be inactive (e.g., disconnected from underlying components of the IC chip 112) during the proximity sensing phase of operation. Conversely, pixels of the ALS area 208 may be active during the ambient light sensing phase of operation whereas pixels of the PS area 204 may be inactive during the ambient light sensing phase of operation. Optionally, the PS area and the ALS area may have a common pixel or a plurality of common pixels. For example, a pixel of the photodetector 116 may be configured to detect ambient light as well as the reflected light from the light source 108.

The pixels of the PS area 204 and ALS area 208 may be intermixed among one another in accordance with at least some embodiments. In other embodiments, the pixels of the PS area 204 may be physically separated from the ALS area 208 by a physical boundary or separation element. For example, the pixels of the PS area 204 may occupy a first area of the photodetector 116 that is a continuous region which does not include any pixels of the ALS area 208 and vice versa. In the intermixed example, the entire area of the photodetector 116 may include alternating pixels belonging to the PS area 204 and ALS area 208. Optionally, the PS area 204 and the ALS area 208 may be interchanged. For example, at a first timing, a first portion of the pixels may be configured to detect ambient light and being a portion of the ALS area 208, but at a second timing, the first portion of the pixels may be configured to detect reflected light and being a portion of the PS area 204. In other words, the PS area 204 and the ALS area 208 may be dynamically interchanged. This can be accomplished through a set of switches coupled to the ALS area 208 and the PS area 204 to reroute the electrical connectivity to underlying circuitry.

Figure 4:
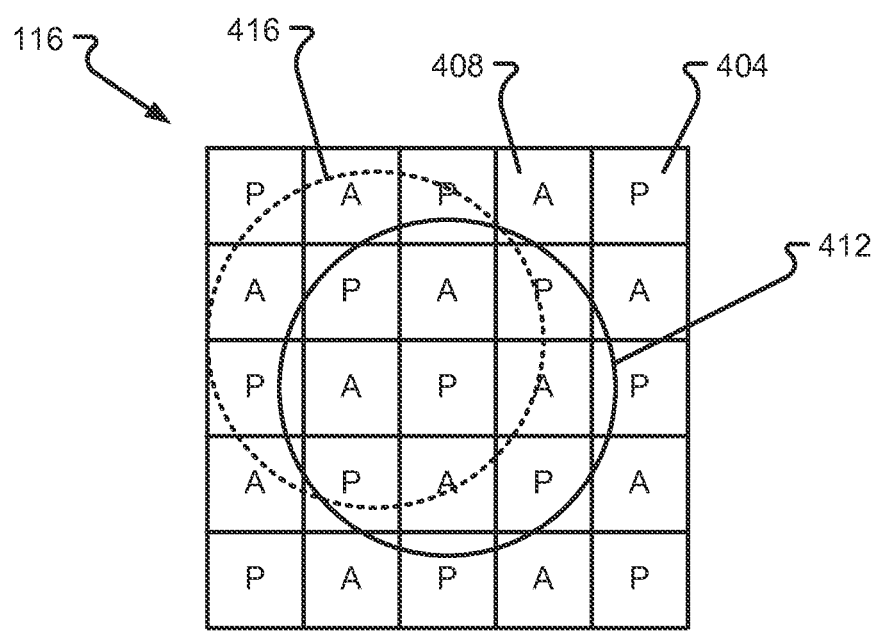
FIG. 4 is a top view of a photodetector array in accordance with at least some embodiments of the present disclosure.

With reference now to FIGS. 3 and 4, additional details of a configuration where the photodetector 116 includes intermixed pixels of the PS area 204 and ALS area 208 will be described in accordance with at least some embodiments of the present disclosure. Firstly, with reference to FIG. 3, the optical system 100 is shown to further include the optical element 304 and the additional optical element 306. The optical element 304 and/or the additional optical element 306 may be constructed of any polymer or combination of polymers using extrusion, machining, micro-machining, molding, injection molding, or a combination of such manufacturing techniques. More specifically, the optical element 304 may be constructed of any transparent or translucent material to both lights 136, 140. Examples of materials that can be used for the optical element 304 include, without limitation, epoxy, silicone, a hybrid of silicone and epoxy, phosphor, a hybrid of phosphor and silicone, an amorphous polyamide resin or fluorocarbon, glass, plastic, or combinations thereof. In some embodiments, the combination optical element 304 may comprise at least one of a solid material, half-solid material, and gel-type encapsulation that substantially encapsulates the IC chip 112 or at least the photodetector 116 on the IC chip 112. In other embodiments, the optical element 304 may comprise an aperture or opening in a material that is otherwise not transparent to the reflected light 308.

FIG. 3 also shows how the optical element 304 receives reflected light 308 (which may be similar or identical to reflected light 136) and focuses the reflected light 308 from the object 124 into focused light 312. The focused light 312 may have the same or similar properties as the reflected light 308 (e.g., same wavelength, intensity, etc.), but the optical element 304 causes the reflected light 308 to be focused into focused light 312 on a particular area of the photodetector 116.

As seen in FIG. 4 and as discussed herein-above, the photodetector 116 may include an array of photosensitive pixels. Some of these pixels may be utilized as photosensitive pixels 404 whereas other pixels may be utilized as ambient light sensing pixels 408. These pixels 404, 408 may be intermixed among one another such that no two adjacent pixels are of the same type (e.g., a photosensitive pixel 404 only has adjacent ambient light sensing pixels 408 at its edges). Another way to describe this particular configuration of the photodetector 116 is to say that each diagonal route across the photodetector array 116 only includes pixels of a single type. It should be appreciated embodiments of the present disclosure are not limited to the depicted arrangement of pixels. As another illustrative configuration, a single row or column of the array may have pixels of the same type and adjacent rows or columns may have pixels of different types.

Regardless of configuration, FIG. 4 further shows that the photodetector array 116 may have a desired focal area 412. This desired focal area 412 may correspond to a focal diameter or area of the focused light 312 produced by the optical element 304. In embodiments where the optical element 304 corresponds to an aperture or the like, then the desired focal area 412 may correspond to an area of the photodetector 116 where light is desired to be cast.

As can be appreciated, however, certain machining imperfections or design tolerances may result in the actual focal area 416 being offset from the desired focal area 412, which is usually centered at the center of the photodetector array. To account for this potential delta between the desired focal area 412 and actual focal area 416, the photodetector array may be configured to have an overall area that is larger than the desired focal area 412 by a predetermined amount—potentially accounting for machining tolerances. In some embodiments, the photodetector array may be at least one pixel larger than the size of the desired focal area 412. In some embodiments, the photodetector array may be sized to include an additional pixel row or column beyond each border of the desired focal area 412. It should be appreciated that if machining tolerances are less precise, then additional area may be added to the photodetector array to accommodate a larger delta between the desired focal area 412 and the actual focal area 416.

As can be appreciated, if the photodetector array is divided such that the PS area 204 is separate and distinct from the ALS area 208 (e.g., there is no intermixing of the pixels 404, 408), then it may become necessary to only design the PS area 204 of the photodetector 116 to account for machining tolerances since the actual focal area 416 is only used for proximity sensing purposes. When intermixed, however, the overall size of the photodetector array may be reduced as compared to if distinct areas are used. This may result in a reduction of size of the optical system 100.

Intermixing (whether partial or total) the pixels 404, 408 may require the utilization of coordinated control over the pixels 404, 408; otherwise, certain pixels designated for sensing light of one type may produce an electrical signal in response to receiving light of another type. Thus, as can be seen in FIG. 5, a photodetector array having intermixed proximity sensing pixels 404 and ambient light sensing pixels 408 may be controlled with time-alternating logic via one or more switches 504, 508.

The pixels 404, 408 may be provided on a common photodetector 116, which means that both pixel types 404, 408 may be responsive to both emitted light 132 and ambient light 140. This may make manufacturing of the photodetector 116 relatively straight-forward since there is no requirement that the different pixels 404, 408 have different physical properties or are only responsive to different wavelengths of light. However, the pixels 404, 408 can be differentiated from one another by the underlying circuitry to which they are connected and the way in which their electrical signals are used to obtain either a proximity sensing reading or an ambient light sensing reading.

Figure 5:
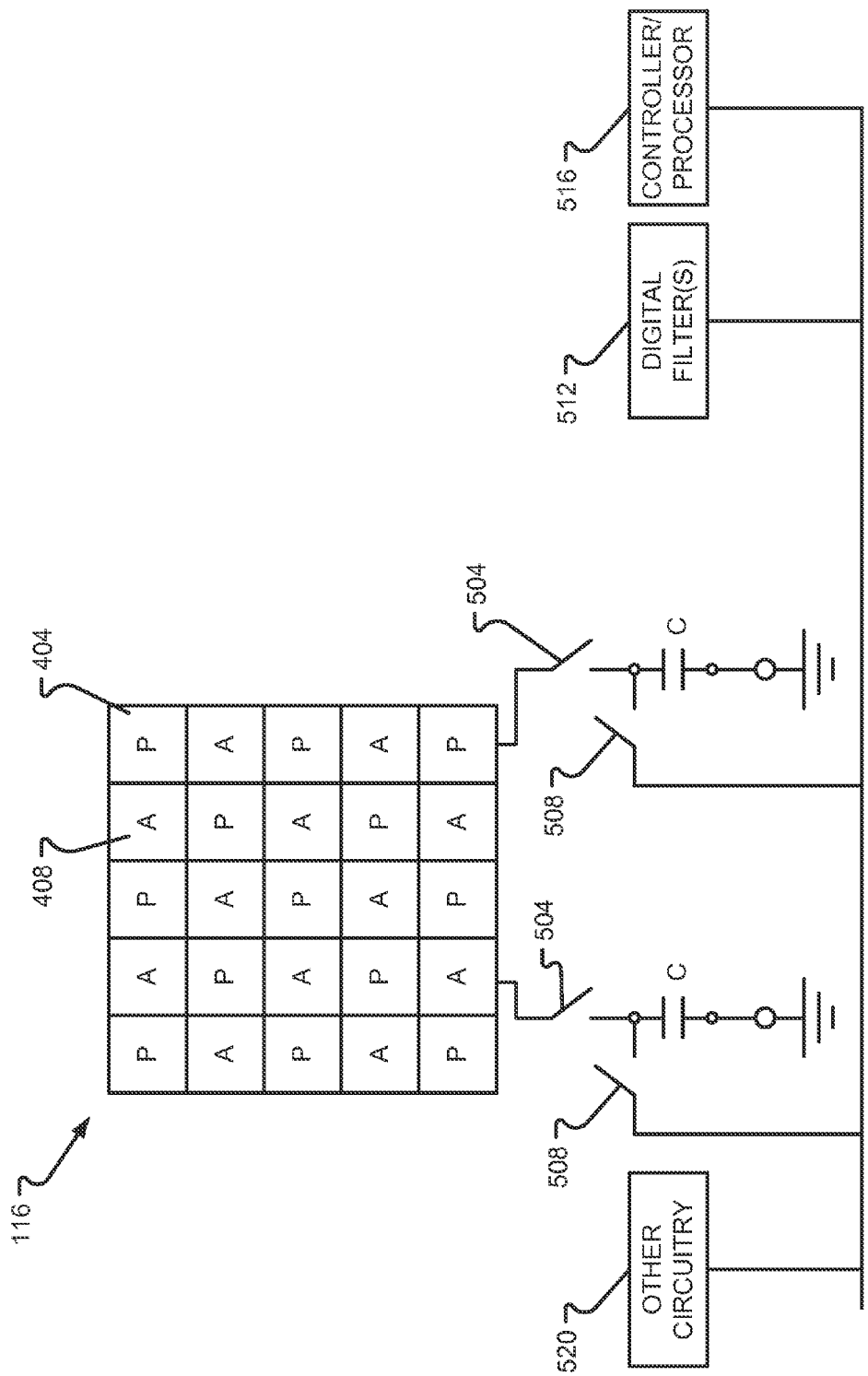
FIG. 5 is a schematic diagram depicting circuit components and their attachment to a photodetector array in accordance with at least some embodiments of the present disclosure.

In particular, FIG. 5 shows that proximity sensing pixels 404 and ambient light sensing pixels 408 may be connected to capacitors C via a first switch 504 and that capacitor C may be further connected to additional circuitry 520 via a second switch 508. The additional circuitry 520 may correspond to circuit elements or a combination of elements in the IC chip 112 capable of processing signals for proximity sensing purposes and/or ambient light sensing purposes.

Although FIG. 5 only shows two pixels being connected to a set of switches 504, 508 and a capacitor C, it should be appreciated that each of the pixels in the photodetector 116 may be connected to a corresponding set of switches 504, 508 and capacitor C. The depiction of only two sets of switches 504, 508 and two capacitors C in FIG. 5 is to avoid confusion and for ease of discussion. In other embodiments, certain pixel rows or pixel columns of the array may be connected to one another and each of the rows or columns may be connected to a single corresponding set of switches 504, 508 and capacitor C. Such a configuration may be where a single row or column is used for ambient light sensing purposes or proximity light sensing purposes only.

The switches 504, 508 of each pixel 404, 408 may be controlled by a controller or processor 516. Alternatively or additionally, each of the capacitors C may be connected to digital filter(s) 512 that filter out unwanted aspects of signals transmitted by the capacitors C. The controller/processor 516 may correspond to a microprocessor or logic circuit in the IC chip 112 or separate from the IC chip 112. More specifically, the controller/processor 516 may correspond to an Arithmetic Logic Unit (ALU) or a Central Processing Unit (CPU).

In some embodiments, the first switches 504 of the proximity sensing pixels 404 and the first switches 504 of the ambient light sensing pixels 408 may be controlled with opposing logic. In other words, the first switches 504 of the proximity sensing pixels 404 may be open when the first switches 504 of the ambient light sensing pixels 408 are closed—and vice versa. This means that capacitors C connected to proximity sensing pixels 404 may be charging (e.g., due to being connected to proximity sensing pixels 408 that are receiving incident light and producing a corresponding electrical current) while capacitor C connected to ambient light sensing pixels 408 may be not charging or discharging/providing current to other circuitry 520.

In some embodiments, the second set of switches 508 may be controlled with logic that is opposite the logic used to control the first switch 504 for the same pixel. In other words, if a capacitor C is not connected to a pixel 404, 408 via a first switch 504, then that same capacitor C may instead be connected to the other circuitry 520 or digital filter(s) 512 via the second switch 508. It follows that the second switches 508 for capacitors C connected to proximity sensing pixels 404 may be controlled with opposite logic than the second switches 508 for capacitors C connected to ambient light sensing pixels 408. Thus, while one set of capacitors C configured to receive current from proximity sensing pixels 404 is charging the other set of capacitors C configured to receive current from ambient light sensing pixels 408 is discharging.

In some embodiments, the exposure time for the proximity sensing pixels 404 (e.g., the amount of time that the first switches 504 for the proximity sensing pixels 404 are closed) may be controlled such that enough signal from the proximity sensing pixels 404 is accumulated to a dynamic voltage range of the capacitors C. Even more specifically, the first switches 504 for the proximity sensing pixels 404 may be closed during a proximity sensing phase of operation whereas the first switches 504 for the ambient light sensing pixels 408 may be open during the proximity sensing phase of operation. The duration of the proximity sensing phase of operation may be controlled such that enough signal is accumulated at the capacitors C. Once enough signal has been accumulated, the controller/processor 516 may switch the switches 504, 508 such that an ambient light sensing phase of operation is implemented. During the ambient light sensing phase of operation, the first switches 504 for the ambient light sensing pixels 408 may be closed whereas the first switches 504 for the proximity sensing pixels 404 may be open. Furthermore, during the ambient light sensing phase of operation the second switches 508 for the ambient light sensing pixels 408 may be open, thereby allowing the corresponding capacitors C to charge. Meanwhile, the second switches 508 for the proximity sensing pixels 404 may be closed during the ambient light sensing phase of operation.

Figure 6:
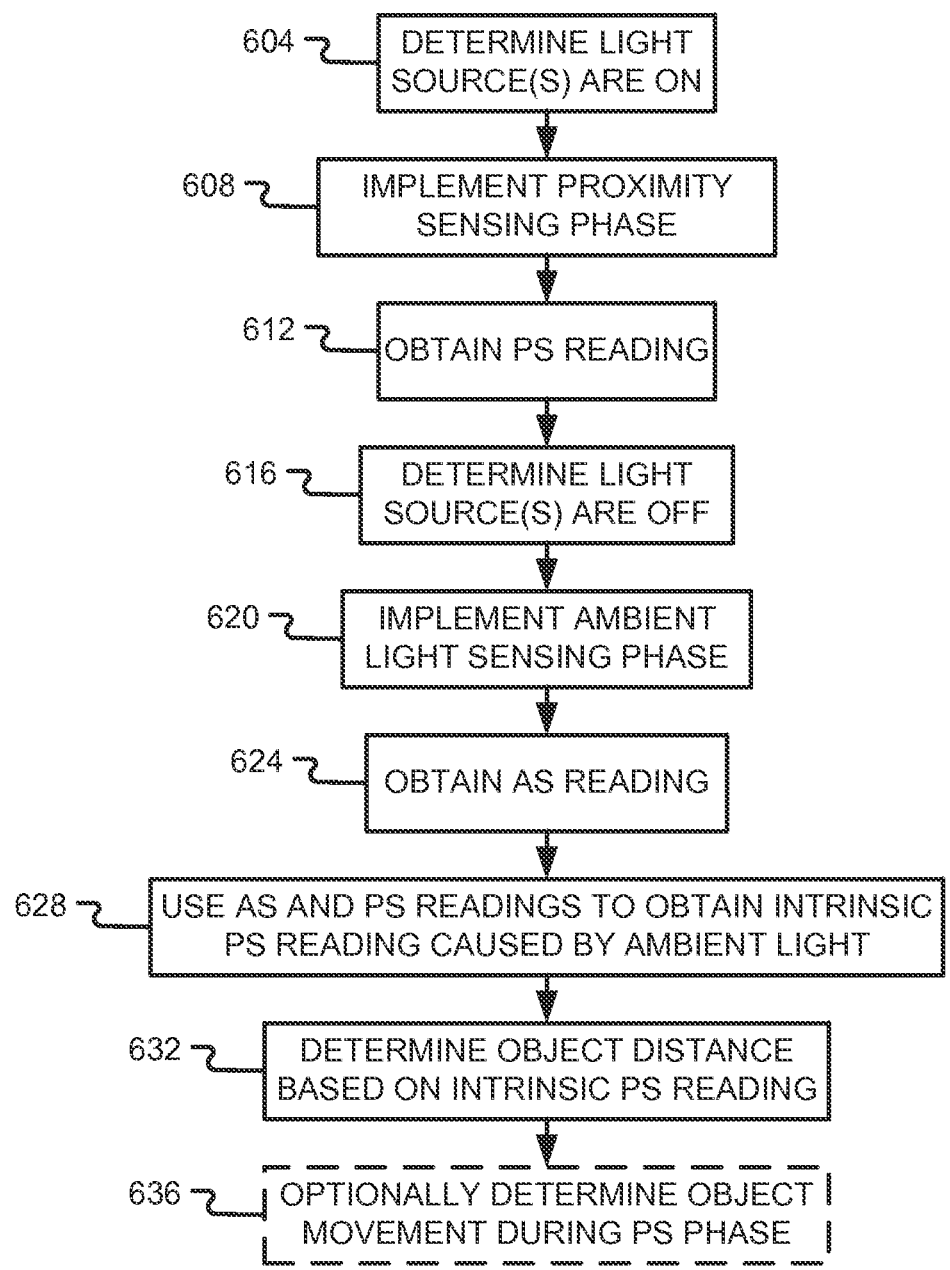
FIG. 6 is a flow diagram depicting a sensing method in accordance with at least some embodiments of the present disclosure.

With reference now to FIG. 6, additional details of a method of operating the optical system 100 will be described in accordance with at least some embodiments of the present disclosure. The method begins when the light source(s) 108 are turned on (step 604). While the light source(s) 108 are on, the controller/processor 516 may implement the proximity sensing phase of operation (step 608). During this phase of operation, the switches 504, 508 for both types of pixels 404, 408 may be controlled such that a proximity sensing (PS) reading is obtained from the capacitors C connected to the proximity sensing pixels 404 (step 612). Again, the amount of time that the proximity sensing phase is implemented may depend upon how much signal is required to accumulate at the capacitor C to enter a desired dynamic voltage range. During this time, the ambient light sensing phase of operation may not be implemented.

The method continues by turning off the light source(s) 108 (step 616). This results in the implementation of the ambient light sensing phase of operation (step 620). During this phase of operation, the switches 504, 508 for both types of pixels 404, 408 may be controlled so that an ambient light sensing (AS) reading can be obtained (step 624).

The method continues with the controller/processor 516 and/or other circuitry 520 processing the PS reading and AS reading to obtain an intrinsic PS reading caused by ambient light 140 (step 628). In some embodiments, the intrinsic PS reading may correspond to a difference between the PS reading and the AS reading (e.g., by subtracting the AS reading from the PS reading).

Once the intrinsic PS reading is obtained, the method continues with the controller/processor 516 and/or other circuitry 520 determining a distance between the object 124 and the photodetector 116 (step 632). In some embodiments, this distance determination is based on the intrinsic PS reading.

In addition to obtaining a distance measurement, the PS reading and AS reading from certain pixels 404, 408 may also be used to optionally determine a direction of movement of the object 124 (step 636). The determined direction of movement may be in a single axis, along two axes, or in three dimensions (e.g., by further incorporating the distance determination made in step 632).

Figure 7:
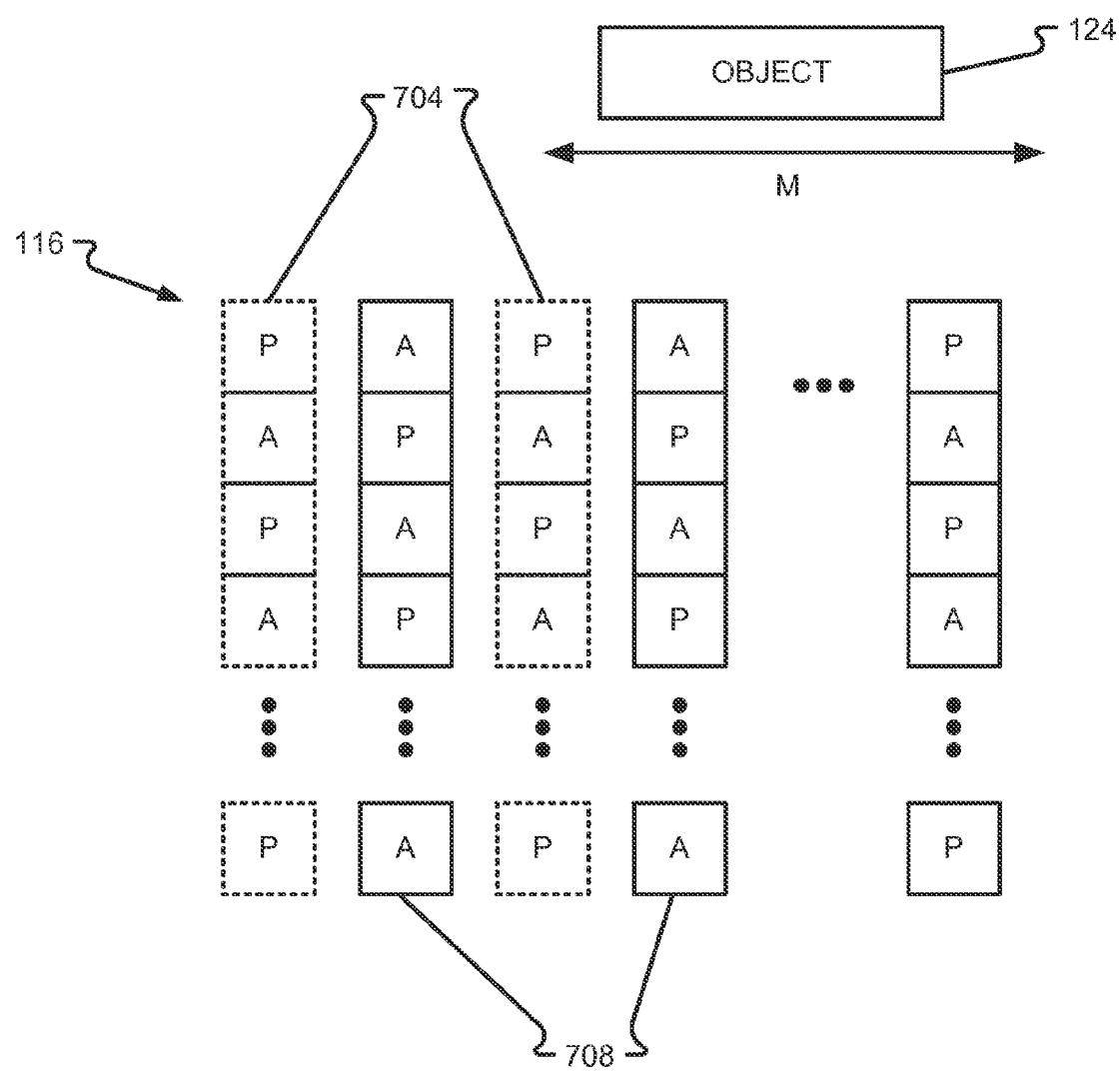
FIG. 7 is a schematic diagram depicting an architecture for detecting a direction of object motion in accordance with at least some embodiments of the present disclosure.
Figure 8:
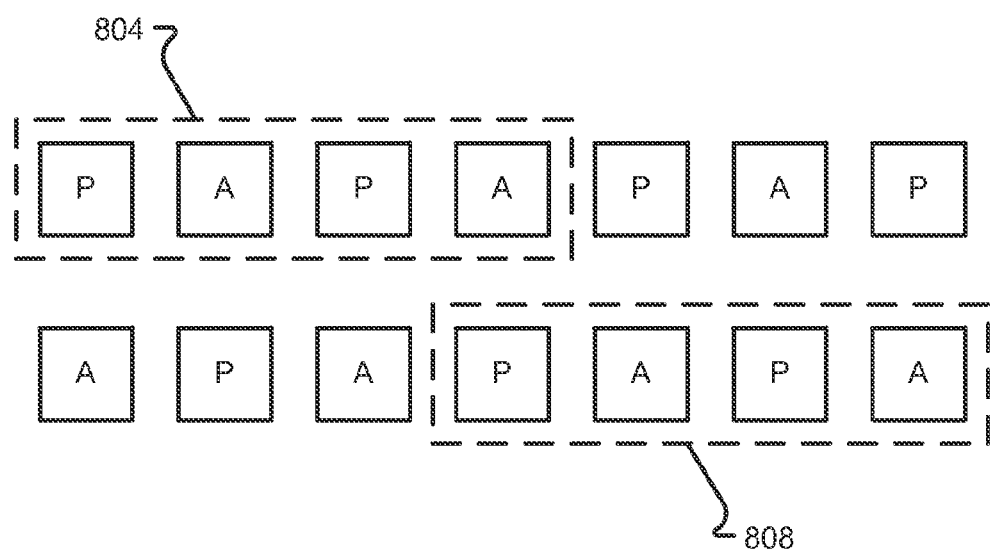
FIG. 8 is a schematic diagram depicting another architecture for detecting a direction of object motion in accordance with at least some embodiments of the present disclosure.

With reference now to FIGS. 7 and 8, two different, but non-limiting, photodetector array configurations used to determine a direction of object 124 movement will be described in accordance with at least some embodiments of the present disclosure. Referring initially to FIG. 7, a first configuration is shown whereby an object's 124 direction of movement M can be determined along a single axis. It should be appreciated that these concepts can be duplicated in a second dimension along a second axis to determine a two-dimension direction of movement without departing from the scope of the present disclosure. The explanation of a single axis of detected movement is for simplicity and ease of discussion only and should not be construed as limiting the scope of the present disclosure.

As shown in FIG. 7, a direction of movement M for the object 124 may be determined through a spatial filter configuration. The spatial filter configuration may be established by connecting alternating rows (or columns) of the array to a summation node, integrator, or the like. In particular, a first selected set of pixels 704 may be connected to a summation node or integrator in the other circuitry 520 whereas a second selected set of pixels 708 may be connected to a different summation node or integrator in the other circuitry 520. The rows or columns (or some other organization of the set) belonging to the first selected set 704 may alternate with the rows or columns belonging to the second selected set 708. Implementing such a configuration may allow a direction of movement M for the object 124 to be determined. In particular, the sum of the signals received from the first selected set of pixels 704 may be compared to the sum of signals received from the second selected set of pixels 708. By making such a comparison, the direction of movement M for the object 124 can be determined. Specifically, in the depicted configuration of FIG. 7, since alternating columns of the array belong to the first and second sets 704, 708, respectively, the direction of movement M perpendicular to the orientation of the columns (e.g., parallel to the rows) can be determined for the object 124.

FIG. 8 shows an alternative selection of pixels that can also be used to determine a direction of movement M for the object 124. Specifically, a first set of pixels 804 may be selected from a first row whereas a second set of pixels 808 may be selected from an adjacent row. The first and second sets 804, 808 may include both proximity sensing pixels 404 and ambient light sensing pixels 408. In other words, both the proximity sensing pixels 404 and the ambient light sensing pixels 408 are employed for motion detection. Optionally only the proximity sensing pixels 404 may be used to determine a direction of movement M for the object 124. In fact, for either the configuration of FIG. 7 or the configuration of FIG. 8, although the selected set of pixels 704, 708, 804, 808 are shown to include both types of pixels 404 and 408, it should be appreciated that it may not be necessary to attach the ambient light sensing pixels 408 to the summation node or integrator since those pixels are used for sensing ambient light and not for sensing light reflected from the object 124. In some embodiments, pixels from the first set of pixels 804 may overlap or share one or more columns with pixels from the second set of pixels 808. By comparing the signals received from the first and second sets of pixels 804, 808, respectively, it may be possible to determine a direction of movement M for the object 124 in two dimensions. The two dimensional determination may be facilitated by the fact that the set of pixels 804, 808 are offset relative to one another in two directions.

Figure 9:
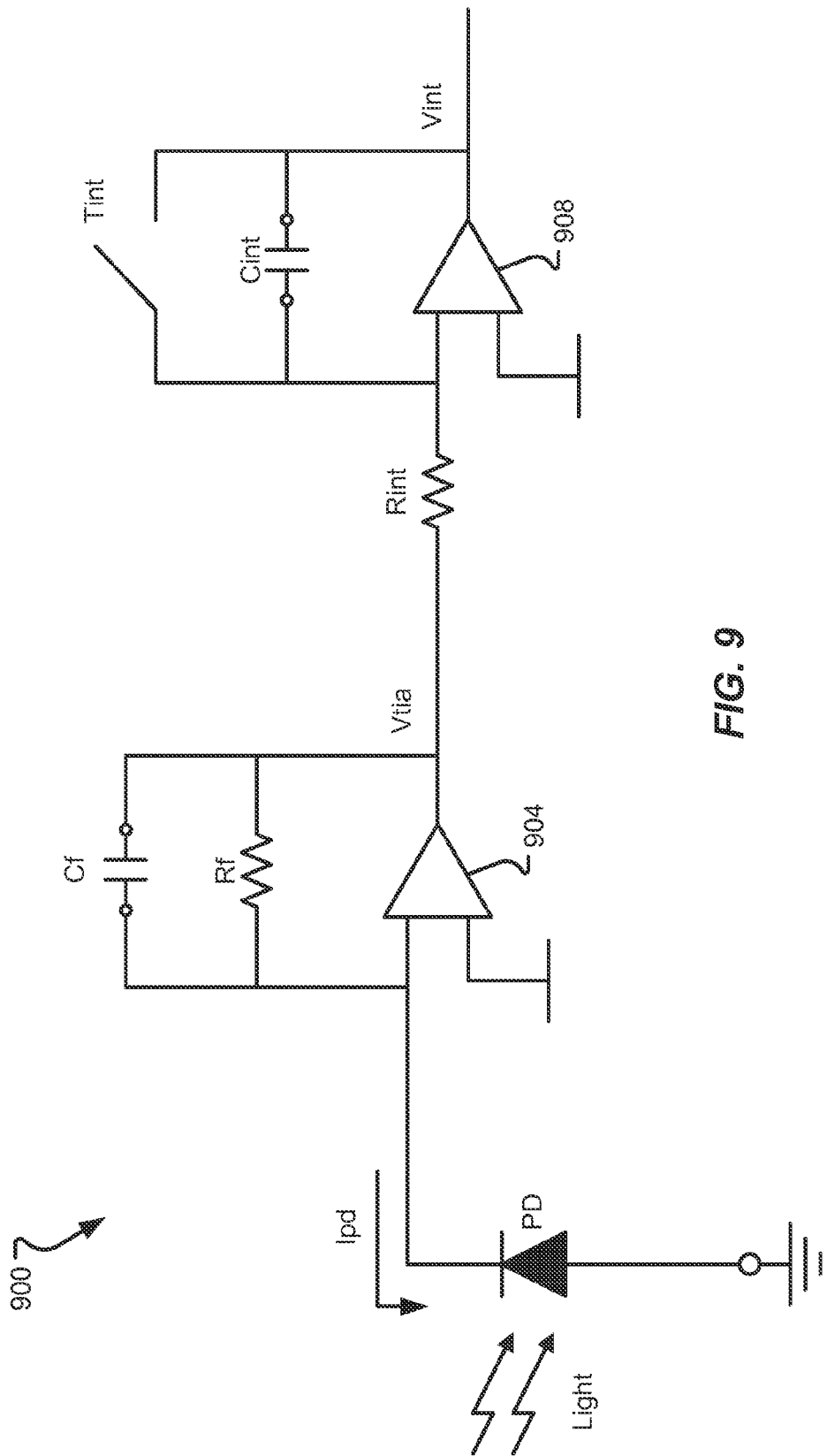
FIG. 9 is a circuit diagram depicting an illustrative circuit used for proximity and ambient light sensing in accordance with at least some embodiments of the present disclosure.

With reference now to FIG. 9, an illustrative circuit 900 that can be used to determine a direction of movement M for an object will be described in accordance with at least some embodiments of the present disclosure. In particular, light from the pixels in a selected set of pixels 704, 708, 804, or 808 (shown as PD in FIG. 9) may be provided to a transimpedance amplifier (TIA) 904. A voltage at the output of the TIA 904 may correspond to a product of the size of the feedback resistor Rf connected across the TIA 904 and the photodetector current Ipd flowing through the photodiode(s) in the selected set of pixels.

The output of the TIA 904 is provided to one or more integrating amplifiers 908 via an integrating resistor Rint. The integrating amplifier(s) 908 may produce an output voltage Vint that is determined according to the following, where Cint is the capacitance of the capacitor Cint connected across the integrating amplifier(s) 908 and where Tint is the integration time (e.g., duration of the proximity sensing phase of operation):

$$Vint = \frac{1}{Cint} \times \frac{Vtia}{Rint} \times Tint$$

Using this light detection circuit 900, it can be seen that the signal strength increases with the integration time Tint. In other words, if there is a time-multiplex in the photodetector current Ipd, then the integrating amplifier 908 can be shared and controlled by the integrating time Tint. Or, if the pixels are switched individually to the TIA 904, then even the TIA 904 can be shared among the different selected set of pixels 704/708 and/or 804/808.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. An optical sensor, comprising:
   a light source;
   a photodetector comprising a plurality of pixels which are used for both proximity light sensing and ambient light sensing; and a controller configured to implement a proximity sensing phase where pixels used for proximity light sensing are utilized to obtain an incident light reading when the light source is ON and then implement an ambient light sensing phase where pixels used for ambient light sensing are utilized to obtain an incident light reading when the light source is OFF, wherein the pixels used for the proximity light sensing are different from the pixels used for ambient light sensing, and wherein the pixels used for the proximity light sensing are connected to a different set of capacitors and switches than the pixels used for ambient light sensing.

2. The optical sensor of claim 1, wherein the controller is further configured to control an exposure time for the photodetector such that a sufficient amount of signal is accumulated by the photodetector to accommodate a dynamic voltage range.

3. The optical sensor of claim 1, wherein the controller is configured to subtract an incident light reading taken during the ambient light sensing phase from an incident light reading taken during the proximity sensing phase to obtain an intrinsic proximity sensing reading that is caused by ambient light.

4. The optical sensor of claim 3, wherein the intrinsic proximity sensing reading that is caused by ambient light is used to determine a distance to an object detected during the proximity sensing phase.

5. The optical sensor of claim 1, wherein the proximity sensing phase is conducted during a time that does not overlap with the ambient light sensing phase.

6. The optical sensor of claim 1, wherein the plurality of pixels are arranged in an array and divided between at least a first selected set of pixels and a second selected set of pixels, wherein readings from the first and second selected set of pixels are used to obtain a determination of object movement during the proximity sensing phase.

7. The optical sensor of claim 1, further comprising a plurality of capacitors that are connected to the photodetector, wherein the plurality of capacitors are coupled to the controller and are selectively switched by the controller thereby enabling the controller to implement the proximity sensing phase and the ambient light sensing phase.

8. The optical sensor of claim 7, further comprising one or more digital filters that are used to control a comparison of readings obtained at specific ones of the plurality of capacitors to determine a movement of an object.

9. An optical system, comprising:
at least one optical element that focuses light passing therethrough; and
a photodetector comprising an array of photo-sensitive unit segments, wherein the photo-sensitive unit segments in the array include a set of ambient light sensor unit segments and a set of proximity sensor unit segments that are intermixed among one another such that no two adjacent pixels are of the same type, and wherein an overall area of the array is larger than a focus area of the at least one optical element.

10. The optical system of claim 9, wherein ambient light sensor unit segments and the proximity sensor unit segments are intermixed among one another such that a diagonal route across the array of photo-sensitive unit segments includes pixels of a single type.

11. The optical system of claim 9, wherein at least one photo-sensitive unit segment in the array is used as an ambient light sensor unit segment during an ambient light sensing phase of operation and wherein the at least one photo-sensitive unit segment in the array is also used as a proximity light sensor unit during a proximity sensing phase of operation.

12. The optical system of claim 9, wherein the array is established on a single piece of silicon.

13. The optical system of claim 9, wherein the overall area of the array is larger than the focus area of the at least one optical element at least by a placement tolerance associated with placing the at least one optical element relative to a center of the array.

14. The optical system of claim 9, further comprising a light source that emits light to be reflected by an object and then detected by the proximity sensor unit segments.

15. The optical system of claim 14, wherein light readings obtained from the ambient light sensor unit segments are subtracted from light readings obtained from the proximity light sensor unit segments to determine an intrinsic proximity sensing reading caused by ambient light.

16. The optical system of claim 15, wherein the intrinsic proximity sensing reading caused by ambient light is used to determine a distance between the array and the object.

17. A sensor, comprising:
a photodetector comprising an array of photo-sensitive unit segments, the array including a proximity sensing portion and an ambient light sensing portion, wherein photo-sensitive unit segments belonging to the proximity sensing portion are intermixed among photo-sensitive units belonging to the ambient light sensing portion such a diagonal route across the array includes photo-sensitive unit segments of a single type; and
a controller that implements two distinct sensing phases that include a proximity sensing phase and an ambient light sensing phase, wherein the proximity sensing portion of the photodetector is used during the proximity sensing phase, and wherein the ambient light sensing portion of the photodetector is used during the ambient light sensing phase.

18. The sensor of claim 17, wherein the proximity sensing phase and ambient light sensing phase do not overlap in time.

19. The sensor of claim 17, wherein the proximity sensing portion is used to detect incident light on the photodetector array during the proximity sensing phase, wherein the ambient light sensing portion is used to detect incident light on the photodetector array during the ambient light sensing phase, wherein the proximity sensing phase corresponds to a time during which a light source of the sensor is ON, and wherein the ambient light sensing phase corresponds to a time during which the light source of the sensor is OFF.

20. The sensor of claim 17, wherein the controller is further configured to control an exposure time for the photodetector such that a sufficient amount of signal is accumulated by the photodetector to accommodate a dynamic voltage range and wherein at least one photo-sensitive unit segment from the array belongs to both the proximity sensing portion and the ambient light sensing portion.

* * * * *